US007016863B1

(12) United States Patent
Kamakura et al.

(10) Patent No.: US 7,016,863 B1
(45) Date of Patent: Mar. 21, 2006

(54) MARKETING SYSTEM AND METHOD PROCESSING MARKET INFORMATION OF CONSUMERS AND DEALERS VIA A NETWORK

(75) Inventors: Akira Kamakura, Kawasaki (JP); Hideki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/901,692

(22) Filed: Jul. 28, 1997

(30) Foreign Application Priority Data

Nov. 20, 1996 (JP) .................................. 8-309036

(51) Int. Cl.
*G06F 17/60* (2006.01)
(52) U.S. Cl. ......................................... 705/26; 705/37
(58) Field of Classification Search .................... 705/1, 705/10, 26
See application file for complete search history.

(56) References Cited

U.S. PATENT DOCUMENTS

| 4,953,209 | A | * | 8/1990 | Ryder, Sr. et al. ............ 380/23 |
| 5,060,165 | A | * | 10/1991 | Schumacher et al. .. 364/478.01 |
| 5,283,731 | A | * | 2/1994 | Lalonde et al. ............... 705/10 |
| 5,478,989 | A | * | 12/1995 | Shepley ....................... 235/375 |
| 5,664,115 | A | * | 9/1997 | Fraser .......................... 705/10 |
| 5,758,324 | A | * | 5/1998 | Hartman et al. ............... 705/1 |
| 5,758,327 | A | * | 5/1998 | Gardner et al. ............... 705/26 |
| 5,794,207 | A | * | 8/1998 | Walker et al. ................. 705/23 |
| 5,884,270 | A | * | 3/1999 | Walker et al. .................. 705/1 |
| 5,913,202 | A | * | 6/1999 | Motoyama .................... 705/35 |
| 6,003,007 | A | * | 12/1999 | DiRienzo ....................... 705/4 |

FOREIGN PATENT DOCUMENTS

SE              9102930 A  *   4/1993

OTHER PUBLICATIONS

Clinton, Wilder, "E-Commerce Emerges", Information Week, v584 p 14(2), Jun. 1996.*
Wyman, John "A Model for Improving Consumer Acceptance of Telemarketing", Pace University, vol. 50/09-A, Disseration Abstract International, p. 2987, 1989.*
Anonymous, "Customer service: How Much is Enough?", ProQuest, Distribution v87n5, pp: 32-44, May 1988.*

* cited by examiner

*Primary Examiner*—Hani M. Kazimi
(74) *Attorney, Agent, or Firm*—Staas & Halsey LLP (57) ABSTRACT

A marketing system is provided wherein consumers disclose their purchase demands so that dealers can purchase the disclosed information. A market information registering unit registers market information including the consumers' demands, and a personal information registering unit registers personal information about the consumers. The market information is posted at posting unit, and a dealer, browsing the posted market information, purchases the market information, whereupon a personal information acquiring unit acquires the personal information. Based on the personal information, the dealer accesses the consumer. The personal information acquiring unit includes a prior approval demand determining unit, which determines whether or not the consumer's approval is required before the dealer accesses the consumer. Also, the personal information acquiring unit includes an access confirming unit for seeking the consumer's approval when the prior approval is required.

7 Claims, 13 Drawing Sheets

| ITEM | CONTENTS |
|---|---|
| PERSONAL ID | MANAGEMENT NO. OF PERSONAL INFORMATION |
| NAME | MEMBER'S NAME |
| READING IN KANA | READING OF NAME IN KANA CHARACTERS |
| SEX | DISTINCTION OF SEX |
| DATE OF BIRTH | DAY, MONTH AND YEAR OF BIRTH |
| OCCUPATION | MEMBER'S OCCUPATION |
| ADDRESS | CITY, PREFECTURE |
| DETAILED ADDRESS | ADDRESS IN MORE DETAIL THAN CITY |
| SINGLE/MARRIED STATUS | SINGLE, MARRIED |
| ... | ... |
| E-MAIL ADDRESS | ELECTRONIC MAIL ADDRESS |
| PHONE NO. | TELEPHONE NO. |
| FAX NO. | FACSIMILE NO. |
| POINTS | NO. OF ACCUMULATED POINTS |

| ITEM | | CONTENTS |
|---|---|---|
| MANAGEMENT INFORMATION | REGISTRATION ID | MANAGEMENT NO. OF REGISTERED INFORMATION |
| | PERSONAL ID | MANAGEMENT NO. OF PERSONAL INFORMATION |
| | DATE OF REGISTRATION | DATE OF REGISTRATION OF INFORMATION |
| MARKET INFORMATION | TYPE | NEWLY-BUILT HOUSE WITH/WITHOUT LAND CONDOMINIUM, APARTMENT, ETC. |
| | ARRANGEMENT OF ROOMS | 2 (ROOMS WITH COMBINED) L(IVING)-D(INING)-K(ITCHEN), 3LDK, 4LDK, ETC. |
| | FREE ENTRY FOR ARRANGEMENT OF ROOMS | FREE ENTRY COLUMN |
| | PRICE | DESIRED PRICE IN TEN THOUSANDS (¥) |
| | PARKING SPACE | REQUIRED, NOT REQUIRED |
| | ... | ... |
| ACCESS INFORMATION | APPROVAL FOR APPROACH | REQUIRED, NOT REQUIRED |
| | ACCESS METHOD | 1. INDIRECT E-MAIL, 2. DIRECT E-MAIL, 3. INDIRECT FAX, 4. DIRECT FAX, 5. INDIRECT MAIL, 6. DIRECT MAIL, 7. DIRECT PHONE CALL, 8. VISIT |
| POSTING TERM | | NO. OF DAYS FOR WHICH REGISTERED INFORMATION IS POSTED |
| PICKUP CORPORATION | | CORPORATE ID OF CORPORATION WHICH PICKED UP INFORMATION |
| NO. OF PICKUPS | | NO. OF PICKUP CORPORATIONS |

FIG. 7

| ITEM | CONTENTS |
|---|---|
| CONSUMER'S ADDITIONAL POINTS 1 | NO. OF POINTS ADDED AT REGISTRATION OF INFORMATION |
| CONSUMER'S ADDITIONAL POINTS 2 | NO. OF POINTS ADDED AT REGISTRATION OF APPROACH INFORMATION |
| CORPORATION ACCOUNT | AMOUNT CHARGED FOR PICKUP |

FIG. 8

| ITEM | DISCLOSURE CATEGORIES | | | | | | | | |
|---|---|---|---|---|---|---|---|---|---|
| | AT POST-ING | AT INFORMATION PICKUP (ACCORDING TO ACCESS METHODS) | | | | | | | |
| | | 1 | 2 | 3 | 4 | 5 | 6 | 7 | 8 |
| PERSONAL ID | O | O | O | O | O | O | O | O | O |
| NAME | × | O | O | O | O | O | O | O | O |
| READING IN KANA | × | O | O | O | O | O | O | O | O |
| SEX | O | O | O | O | O | O | O | O | O |
| DATE OF BIRTH | × | O | O | O | O | O | O | O | O |
| AGE (BASED ON DATE OF BIRTH) | O | O | O | O | O | O | O | O | O |
| OCCUPATION | O | O | O | O | O | O | O | O | O |
| ADDRESS | O | O | O | O | O | O | O | O | O |
| DETAILED ADDRESS | × | × | × | × | × | × | O | × | O |
| SINGLE/MARRIED STATUS | O | O | O | O | O | O | O | O | O |
| .. | .. | . | . | . | . | . | . | . | . |
| E-MAIL ADDRESS | × | × | O | × | × | × | × | × | O |
| PHONE NO. | × | × | × | × | × | × | × | O | O |
| FAX NO. | × | × | × | × | O | × | × | × | O |
| POINTS | × | × | × | × | × | × | × | × | × |
| MARKET INFORMATION | O | O | O | O | O | O | O | O | O |
| ACCESS METHOD | O | O | O | O | O | O | O | O | O |
| PICKUP CORPORATION | × | × | × | × | × | × | × | × | × |
| NO. OF PICKUPS | O | O | O | O | O | O | O | O | O |
| POSTING TERM | O | O | O | O | O | O | O | O | O |

FIG. 9

| ITEM | CONTENTS |
|---|---|
| CORPORATE ID | MANAGEMENT NO. OF CORPORATE INFORMATION |
| CORPORATION NAME | NAME OF CORPORATION |
| READING IN KANA | READING OF CORPORATION NAME IN KANA |
| ADDRESS | ADDRESS OF CORPORATION |
| ... | ... |
| ACCOUNT | CUMULATIVE CHARGE |

FIG. 10

PRIMARY NEEDS

20a {
- NEWLY-BUILT PROPERTY ☐ HOUSE WITH LAND ☐ HOUSE WITHOUT LAND ☐ CONDOMINIUM
- ARRANGEMENT OF ROOMS ☐ 2LDK ☐ 3LDK ☐ 4LDK ☐ 5LDK      FREE ENTRY [    ]
- PRICE (¥) IN TEN THOUSANDS  [   ] ~ [   ]               FREE ENTRY [    ]
- DESIGNATION OF LOCATION ☐ RAILROAD ☐ CITY
- PARKING SPACE ☐ REQUIRED ☐ NOT REQUIRED                 FREE ENTRY [    ]

20b {
INFORMATION RECEPTION METHOD
- ☐ E-MAIL FROM CENTER        ☐ E-MAIL DIRECTLY FROM CORPORATION    FREE ENTRY [    ]
- ☐ FAX FROM CENTER           ☐ FAX DIRECTLY FROM CORPORATION       FREE ENTRY [    ]
- ☐ MAIL FROM CENTER          ☐ DIRECT MAIL FROM CORPORATION
- ☐ DIRECT PHONE CALL FROM CORPORATION   ☐ RECEIVE VISIT FROM CORPORATION

20c { PRIOR APPROVAL  ☐ REQUIRED  ☐ NOT REQUIRED

20d { GOODS PURCHASE MOTIVATION LEVEL  [██████░░░░]

20e { POSTING TERM  [   ] DAYS

LIST OF HOUSING REQUESTS

| TYPE | ARRANGEMENT OF ROOMS | BUDGET (IN TEN THOUSANDS) | LOCATION | AGE | OCCUPATION | DATE OF REGISTRATION | PICKUP |
|---|---|---|---|---|---|---|---|
| 1. READY-BUILT HOUSE | 4LDK | 5000 | CHIBA | 45 | OFFICE WORKER | 5/24 | 2 |

MARKETING SYSTEM AND METHOD PROCESSING MARKET INFORMATION OF CONSUMERS AND DEALERS VIA A NETWORK

BACKGROUND OF THE INVENTION (1) Field of the Invention

The present invention relates to a marketing system, and more particularly, to a marketing system operated under the leadership of consumers wherein consumers disclose their interest in or intention to purchase goods on an electronic network so that goods dealers can buy the right to communicate with the consumers.

(2) Description of the Related Art

In the form of marketing conventionally established for buying and selling goods, a dealer sets up shop at a certain location so that goods or services are available there, and a consumer as a customer visits the shop and purchases goods or services if they meet the consumer's needs. Another popular form of marketing is mail order wherein consumers buy goods that are publicized through communication media such as broadcasting, publications, electronic networks, etc.

In economic societies, markets are generally operated in such a way that suppliers who provide goods or services to consumers take the leadership in the marketing. That is, dealers who supply respective different genres of goods have their places of marketing, such as shops, and consumers as purchasers visit such places selling goods they want and purchase desired goods. This form of marketing is dominant because, although goods generally can be kept at a certain place forever until their purchasers visit there, consumers cannot stay at the same place forever and wait until certain goods to come to the inventory; consequently, a market is a place where a person possessing goods runs a shop to sell the goods.

In the conventional form of marketing, when consumers need certain goods or services, they must look for a shop selling such goods or services for themselves. Therefore, if the goods sought for are not very popular, it is difficult for consumers to locate a shop dealing in such goods, and also requires much time and labor in locating a right shop.

SUMMARY OF THE INVENTION

An object of the present invention is to provide a novel marketing system wherein consumers themselves disclose their demands for goods in certain ways and dealers purchase the disclosed information along with information about the consumer's preferred communications means, etc. for the selling of their goods.

To achieve the above object, there is provided a marketing system for processing market information of consumers and dealers via an electronic network. This marketing system comprises personal information registering means for registering personal information of a consumer, market information registering means for registering market information about goods which the consumer desires to purchase, posting means for extracting and posting the market information registered in the market information registering means according to genres, and personal information acquiring means for acquiring personal information of the consumer necessary for a dealer to access the consumer from the personal information registering means when the market information posted at the posting means is purchased by the dealer.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, the present invention will be outlined with reference to the drawings.

Figure 1:
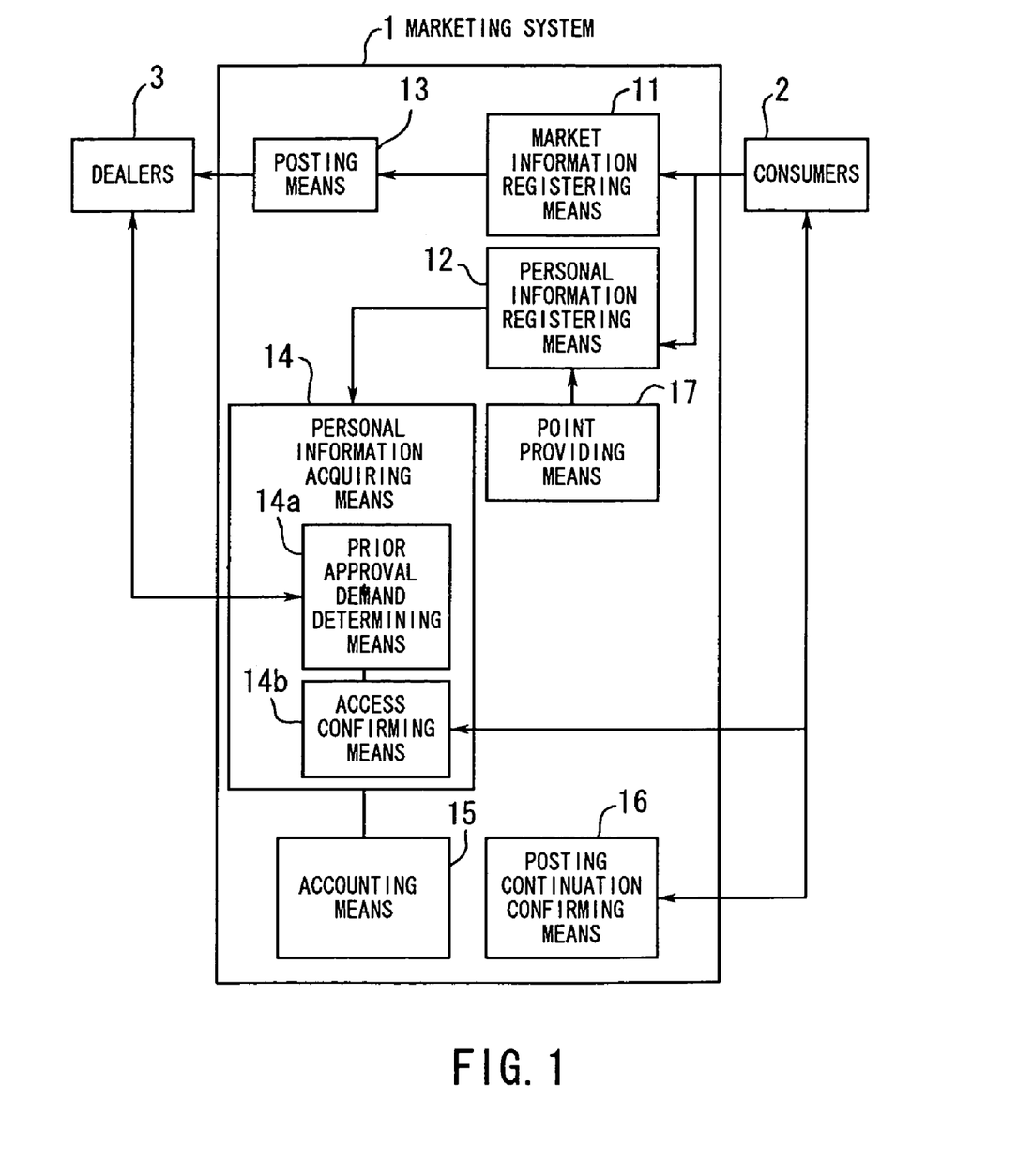
FIG. 1 is a diagram illustrating the principle of a marketing system according to the present invention.

FIG. 1 is a diagram illustrating the principle of a marketing system according to the present invention. The marketing system 1 of the present invention is constructed on an electronic network so as to act as an intermediary between consumers 2 and dealers 3. This marketing system 1 comprises market information registering means 11 for registering in advance market information about goods which the consumers 2 desire to purchase, personal information registering means 12 for permitting the consumers 2 to register their personal information, posting means 13 for posting the market information registered in the market information registering means 11, personal information acquiring means 14 for acquiring the personal information of a consumer 2 necessary for accessing the consumer 2 when a dealer 3, browsing the posted market information, purchases market information of interest which the consumer 2 has registered, accounting means 15 for processing accounts resulting from purchasing of the market information, posting continuation confirming means 16 for periodically inquiring of the consumers 2 whether the consumers desire to continue the posting of their market information, and point providing means 17 for giving bonus points to the consumers 2 at the time of registration of the personal information, etc. The personal information acquiring means 14 includes prior approval demand determining means 14*a* for determining whether or not approval of a consumer 2 is required before a dealer 3 accesses the consumer 2, and access confirming means 14*b* for seeking prior approval of the consumer 2.

In the marketing system configured as described above, the consumers 2 first register their personal information in the personal information registering means 12, and register their market information in the market information registering means 11. At this time, the point providing means 17 gives bonus points to the individual consumers 2. The posting means 13 posts the market information according to genres, and thus the dealers 3, browsing previously registered genres of market information posted at the posting means 13, search for market information of interest. If, as a result of the information search, a dealer 3 finds a prospective customer who may possibly buy goods, the dealer 3 purchases the market information of such a prospective customer. The personal information acquiring means 14 then acquires the information necessary for accessing the prospective customer (the consumer 2) and notifies it to the dealer 3. In this case, the prior approval demand determining means 14*a* determines whether or not the consumer's approval is required before the dealer 3 accesses the consumer 2, and if prior approval is required, the access confirming means 14*b* inquires of the consumer 2 about the dealer's access. If the consumer 2 approves the access from the dealer 3, the personal information acquiring means 14 discloses for the first time the personal information acquired from the personal information registering means 12 to the dealer 3. At this time, the accounting means 15 performs an accounting process to charge the dealer 3, who acquired the personal information, for the purchase of the market information. Based on the acquired personal information, the dealer 3 accesses the consumer 2. If the dealer 3 succeeds in the sale and the consumer 2 buys goods, the point providing means 17 gives the consumer 2 extra points in reward for the purchase. A predetermined term is set for which the market information is posted at the posting means 13, and when the predetermined term has elapsed, the posting continuation confirming means 16 inquires of the consumer 2 whether he or she desires to continue the posting. In the case where the consumer purchased his/her desired goods, for example, and thus the market information need not be posted any longer, the posting of the market information can be stopped, and if the market information needs to be continuously posted thereafter, the posting term may be renewed. The consumer 2 can exchange his/her bonus points for a gift or the like equivalent to the number of the points, whereby part of the purchase price is returned to the consumer 2.

The marketing system according to the present invention employs a form of marketing converse to the conventional one in which sellers take the initiative; namely, the consumers 2 as purchasers disclose their goods purchase requests, and the dealers, browsing the consumers' requests, sell goods to the consumers 2. Accordingly, in cases where a consumer does not know where his/her desired goods or services are available, for example, he/she has only to disclose the desired goods or services. After browsing the consumer's request, dealers access the consumer, and it is therefore unnecessary for the consumer to look for a shop where the desired goods or services are available.

The following explains an embodiment of the present invention applied, by way of example, to a purchase information servicing system which is constructed on an electronic network and in which corporations buy the purchase information about consumers' desired goods for the promotion of their business activities.

Figure 2:
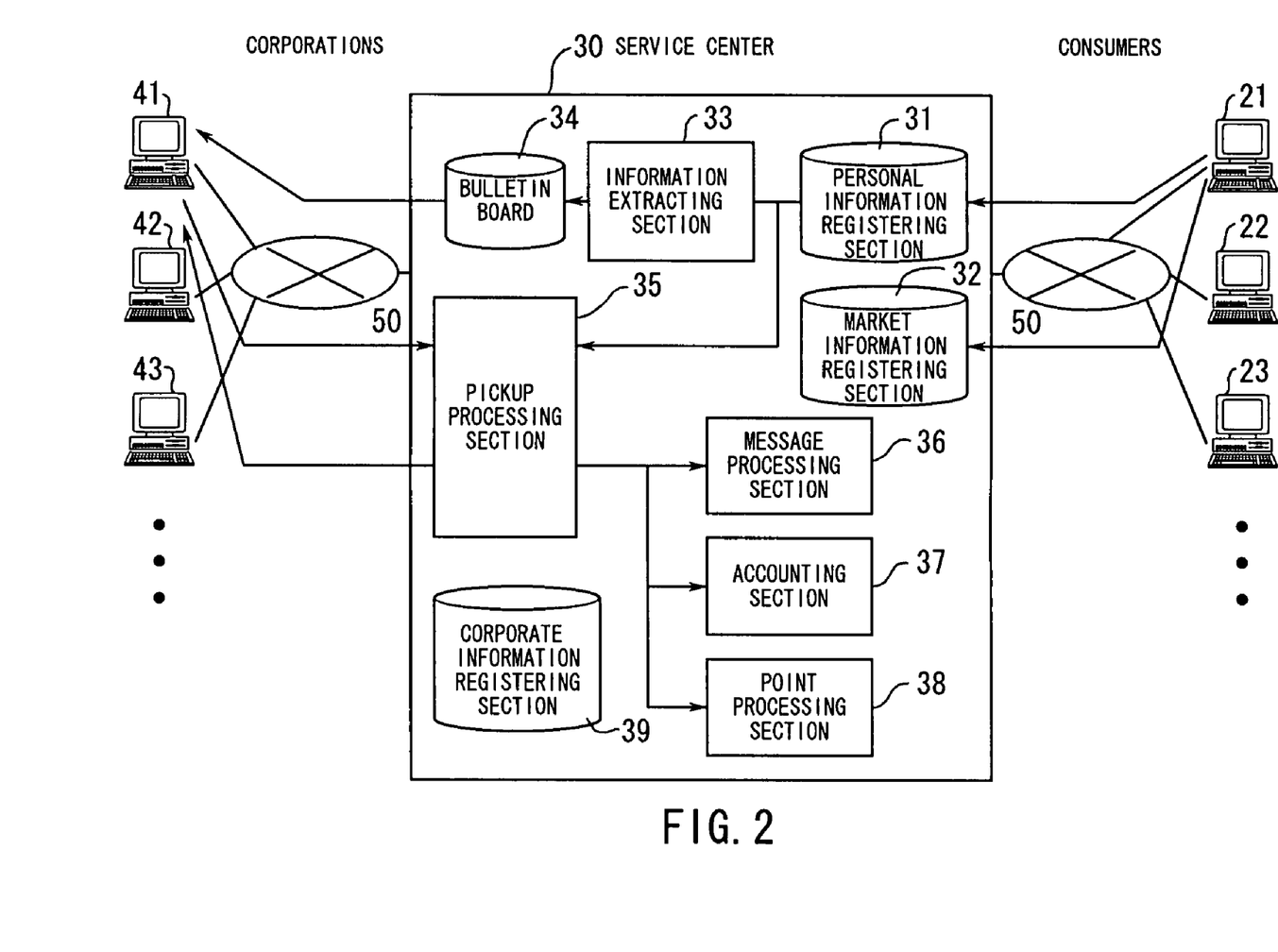
FIG. 2 is a diagram showing the configuration of a purchase information servicing system to which the marketing system of the present invention is applied.

FIG. 2 is a diagram showing the configuration of the purchase information servicing system to which the marketing system according to the present invention is applied. This purchase information servicing system is configured as a networked environment in which a plurality of consumer members' terminals 21, 22, 23, . . . , a service center 30, and a plurality of corporate members' terminals 41, 42, 43, . . . are interconnected via networks 50.

The service center 30 comprises a personal information registering section 31 for registering demographic information etc. of the consumer members, a market information registering section 32 for registering market information about goods which the consumer members desire to purchase, an information extracting section 33 for extracting information to be disclosed to the corporate members from the personal information registering section 31 and the market information registering section 32, a bulletin board 34 for posting the extracted information according to genres of interest (genres of goods) which the corporate members and the consumer members have in common, a pickup processing section 35 for permitting the corporate members to perform a market information pickup process, a message processing section 36 for processing messages for the consumer members, an accounting section 37 for charging corporate members which have purchased the market information, a point processing section 38 for giving bonus points to consumer members when the consumer members registered their personal information etc. or purchased goods, and a corporate information registering section 39 for registering information about the corporate members.

The purchase information servicing system adopts a membership system, and therefore, consumers and corporations are required to register the necessary information when becoming members. Consumer members register their personal information, such as demographic information and electronic mail address, in the personal information registering section 31. The contents of registration of the consumer members can be checked for confirmation or be modified at any desired time. Corporate members also register summary information about their corporations in the corporate information registering section 39 when becoming members. At this time, the corporate members select in advance the fields of their business activities, that is, genres to browse, and pay a basic browsing charge for each of the selected browsing genres. Accordingly, the corporate members can browse only the selected browsing genres.

The information extracting section 33 extracts the necessary information from the registered market information according to genres, and outputs the extracted information to the bulletin board 34. The genres of market information posted on the bulletin board 34 include, for example, real estates (houses, secondhand condominiums, apartments for rent, etc.), domestic tours/spas/Japanese-style inns/hotels/amusement parks, overseas travels (classified according to geographic regions), golfing, golf gear, furniture/interior, gardens/horticulture/landscaping, automobiles, books, stationery, health/medical care, fashion, personal computers, etc.

When the corporate members pick up information on certain consumer members as prospective customers from the market information posted on the bulletin board 34, the pickup processing section 35 acquires the information necessary to access these consumer members. Also, the pickup processing section 35 causes the message processing section 36 to send an electronic mail message to a consumer member for approval of corporate member's access if the consumer member demands his/her approval before an actual access, informs the accounting section 37 of purchase of the market information, and informs the point processing section 38 of consumer member's purchase of goods from a corporate member.

Figure 3:
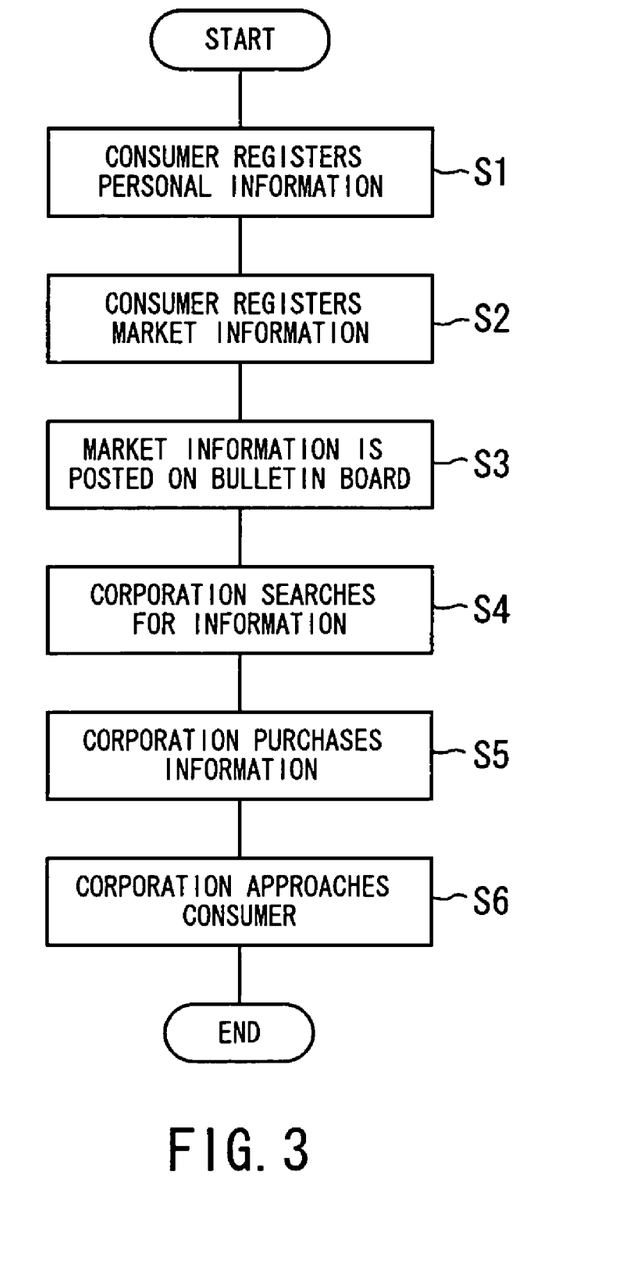
FIG. 3 is a flowchart showing a schematic procedure of processing in the purchase information servicing system.

Referring now to FIG. 3, a schematic procedure of processing of the purchase information servicing system will be explained.

FIG. 3 is a flowchart showing the schematic procedure of processing of the purchase information servicing system. First, a consumer member registers personal information (Step S1), selects a genre to post market information and then registers the market information (Step S2). The market information registered in this manner is posted on the bulletin board 34 according to genres (Step S3). A corporate member then browses the bulletin board 34 to search through the posted market information (Step S4), and purchases information about prospective customer members from among the posted information (Step S5). Based on the purchased information, the corporate member makes approaches to the consumer members (Step S6).

Figure 4:
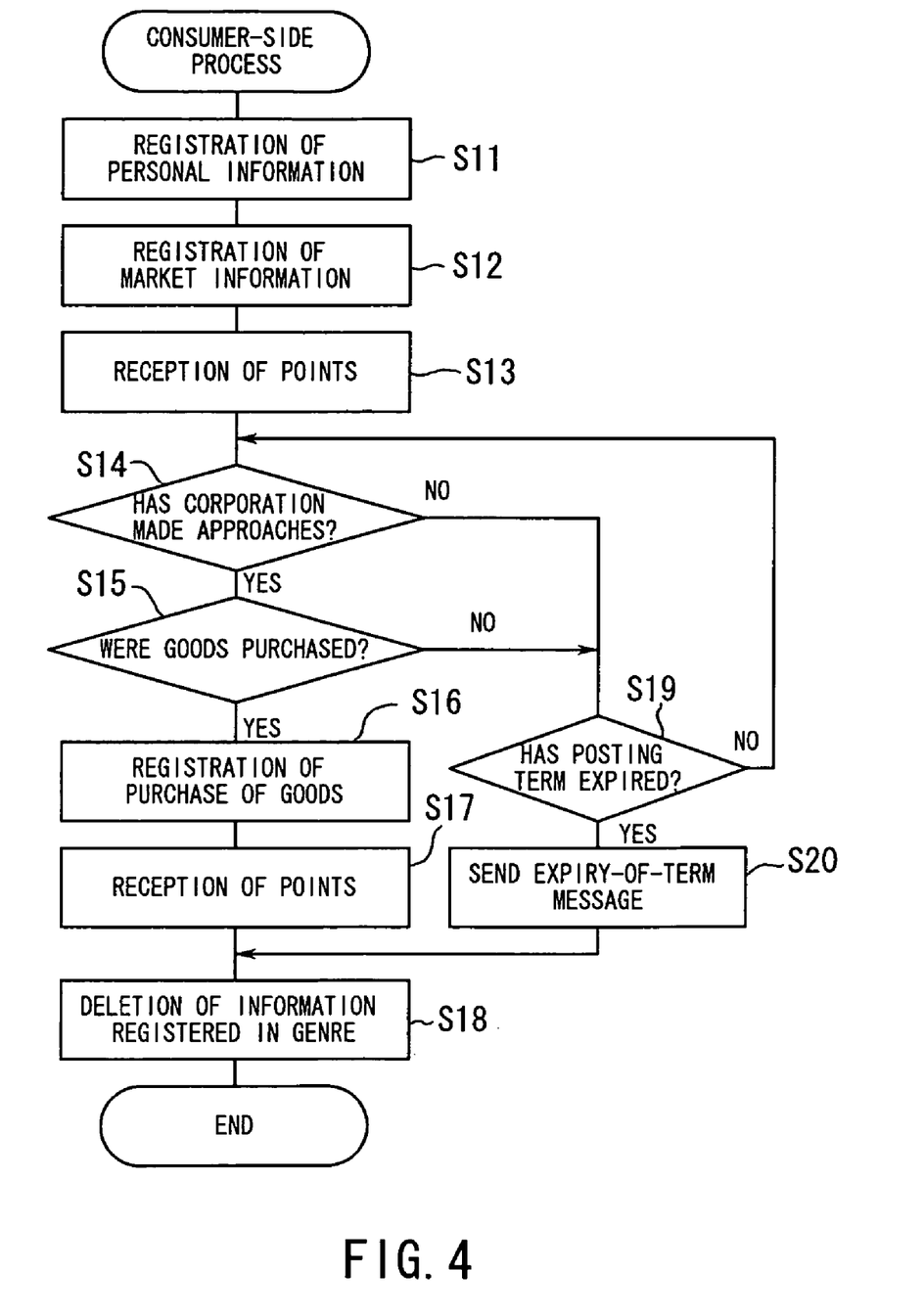
FIG. 4 is a flowchart showing the procedure of a consumer member-side process.

FIG. 4 is a flowchart showing the procedure of a consumer member-side process. A consumer member first registers personal information (Step S11), selects the genre he/she wishes to post market information and then registers the market information (Step S12), whereupon the consumer member is given a part of bonus points (Step S13). The registered market information is posted, and it is determined whether or not any corporate member has made approaches (Step S14). If it is judged that a corporate member made approaches, it is then determined whether or not the consumer member has purchased goods (Step S15). If it is judged that goods have been purchased, purchase of goods is registered (Step S16), and the consumer member is given the remaining points (Step S17). The number of the remaining points depends on the purchase price or the like and constitutes part of the payment refunded to the consumer member. After the consumer member purchases goods, it is no longer necessary to keep the market information posted on the bulletin board, and therefore, the consumer member deletes the market information registered in the genre concerned (Step S18).

If it is judged in Step S14 that no corporate members have made approaches, or if it is judged in Step S15 that goods were not purchased though a corporate member made approaches, it is determined whether or not a term for which the market information is posted has expired (Step S19). If it is judged that the posting term has not yet expired, the flow returns to Step S14; if it is judged that the posting term has expired, a message notifying the consumer member of expiration of the posting term is sent (Step S20), and the flow proceeds to Step S18.

Figure 5:
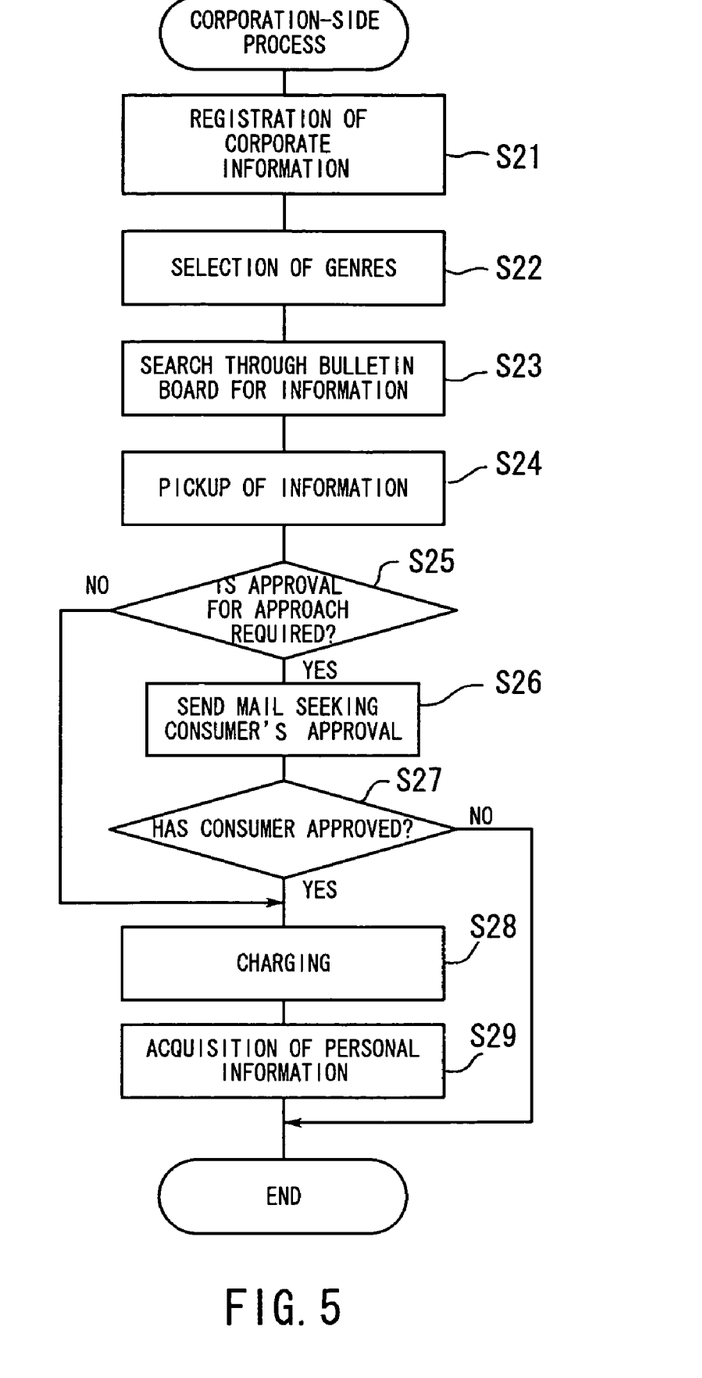
FIG. 5 is a flowchart showing the procedure of a corporate member-side process.

FIG. 5 is a flowchart showing the procedure of a corporate member-side process. In the corporate member-side process, first, corporate information such as summary of a corporation is registered in the corporate information registering section 39 (Step S21). After selecting browsing genres which the corporate member wishes to browse, the corporate member pays the basic browsing charge (Step S22). Then, browsing the market information posted on the bulletin board 34, the corporate member searches for useful information (Step S23) and picks up the required information (Step S24). Subsequently, it is determined whether or not the consumer member who registered the information thus picked up has made setting such that prior approval is required when a corporate member approaches the consumer member (Step S25). If the consumer member's setting is such that the prior approval is required, a message seeking approval is sent to the consumer member (Step S26). It is then determined whether or not the consumer member's approval has been received (Step S27), and if the consumer member does not approve, this process is ended. On the other hand, if the consumer member approves the corporate member's approach, or in the case where it is judged in Step S25 that prior approval is unnecessary, the corporate member is charged (Step S28) and is permitted to acquire the personal information of the consumer member including information necessary for making approaches (Step S29).

Figure 6:
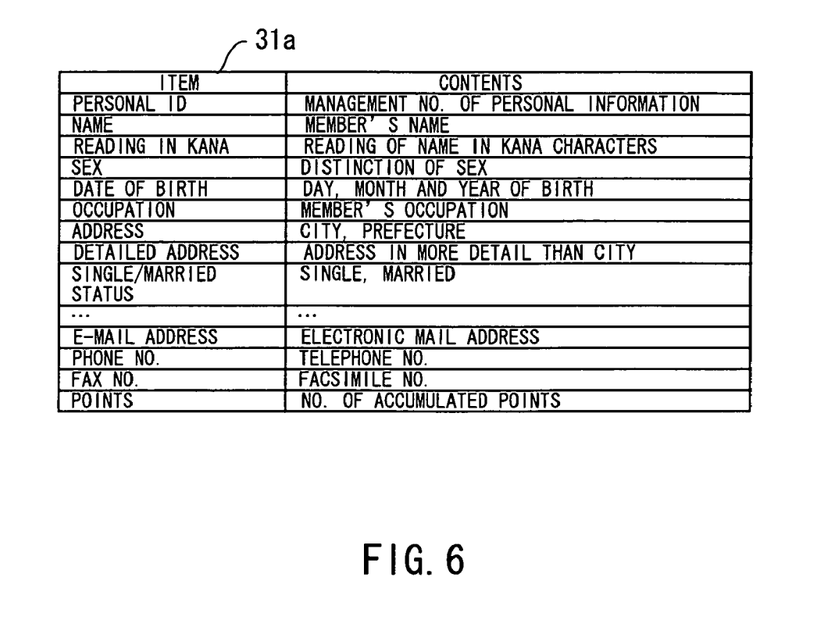
FIG. 6 is a diagram showing, by way of example, contents of a personal information file holding personal information.

FIG. 6 is a diagram showing, by way of example, the contents of a personal information file holding the personal information. The personal information file 31a is recorded in the personal information registering section 31 and contains the personal information. The personal information includes, for example, basic demographic information such as "personal ID (identifier)" which is a management number assigned to the personal information, "name," "reading of name in kana characters," "sex," "date of birth," "occupation," "address" in which is recorded the address roughly by the prefecture and city, "detailed address" in which is recorded the more detailed address than the city, and "single/married status," as well as other information including the items "electronic mail address" which is necessary when a mail message seeking approval is to be sent, "telephone number," "facsimile (FAX) number," and "points" in which is recorded the number of accumulated bonus points.

Several items of the personal information are extracted as needed by the information extracting section 33 and used for the posting of market information on the bulletin board 34. For example, in the case where the posting genre is "books," the items "sex" and "date of birth" are extracted and the consumer member's sex, and age calculated from the date of birth are posted on the bulletin board 34, together with the market information.

Figure 7:
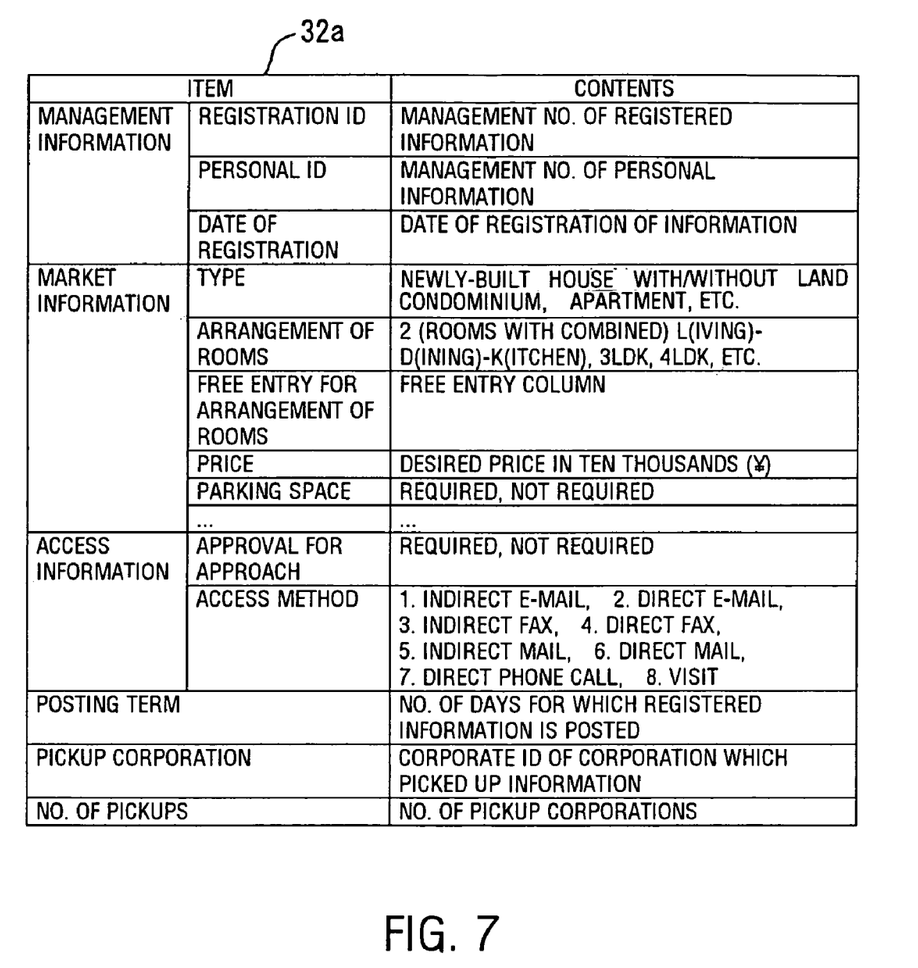
FIG. 7 is a diagram showing, by way of example, contents of a market information file holding market information.

FIG. 7 is a diagram showing, by way of example, the contents of a market information file holding the market information. The market information file 32a is recorded in the market information registering section 31. Since items of information needed to be posted as the market information more or less differ depending on the genres, the forms for registering market information also differ according to genres. In the illustrated example, the market information file 32a contains market information registered for the real-estate genre.

Management information is provided by the system at the time of registration of market information, and includes "registration ID" which is a management number assigned to the registered information, "personal ID" which is the management number assigned to the personal information, and "date of registration" on which the market information is registered. The market information includes "type" of real estate which indicates whether the consumer member desires a newly-built house with land ownership, a house without land (building only), a condominium or an apartment for rent, "interior structure," "desired interior structure" in which the consumer member can freely enter his/her preferences, "price" which the consumer member desires, and "parking space." Access information includes "approval for approach" which indicates whether or not prior approval is required when a corporate member makes approaches to the consumer member, and "access method" which specifies the type of access allowed to corporate members. The access method may be one of indirect sending of electronic mail from the service center 30, direct sending of electronic mail from corporate members, indirect facsimile transmission from the service center 30, direct facsimile transmission from corporate members, indirect mailing of material from the service center 30, direct mailing of material from corporate members, direct telephone call from corporate members, and visit to the consumer member's home. Although not shown in the example of FIG. 7, the "access method" includes an item for specifying a date on which the consumer member wishes to receive a telephone call or a visit, etc. in the case where the access method specified is direct telephone call or visit.

"Posting term" is a field in which is entered the number of days for which the registered information is posted. This "posting term" is provided in order to avoid the situation where the registered information is posted for an unnecessarily long time of period because of consumer member's omission of notification, though in actuality the market information need not be posted any longer, and is used so that, when a consumer member cannot purchase the desired goods within the posting term, an electronic mail may be sent to the consumer member to ascertain whether he/she wishes to continue the posting of the market information or not.

"Pickup corporation" is a column in which are entered the corporate IDs of corporations which picked up the market information, and "number of pickups" is a column in which is entered the number of corporations which picked up the market information.

Figure 8:
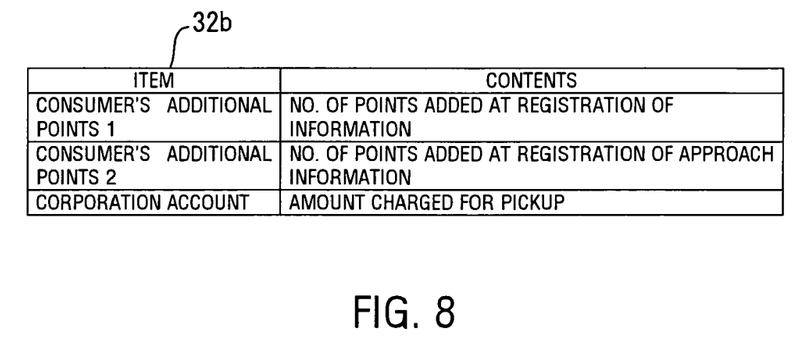
FIG. 8 is a diagram showing, by way of example, contents of a genre information file holding genre information.

FIG. 8 is a diagram showing, by way of example, the contents of a genre information file holding genre information. The genre information file 32b is recorded in the market information registering section 31, for example. The genre information can be registered for each of the posting genres, and the example of FIG. 8 shows the genre information file 32b registered for the real-estate genre.

The genre information file 32b includes the field "consumer's additional points 1" in which is set the number of bonus points added when a consumer member registers market information, the column "consumer's additional points 2" in which is set the number of bonus points added when information indicating the purchase of goods as a result of corporate member's approaches is registered, and the column "corporation account" in which is set the amount of money a corporate member is charged when picking up market information.

Figure 9:
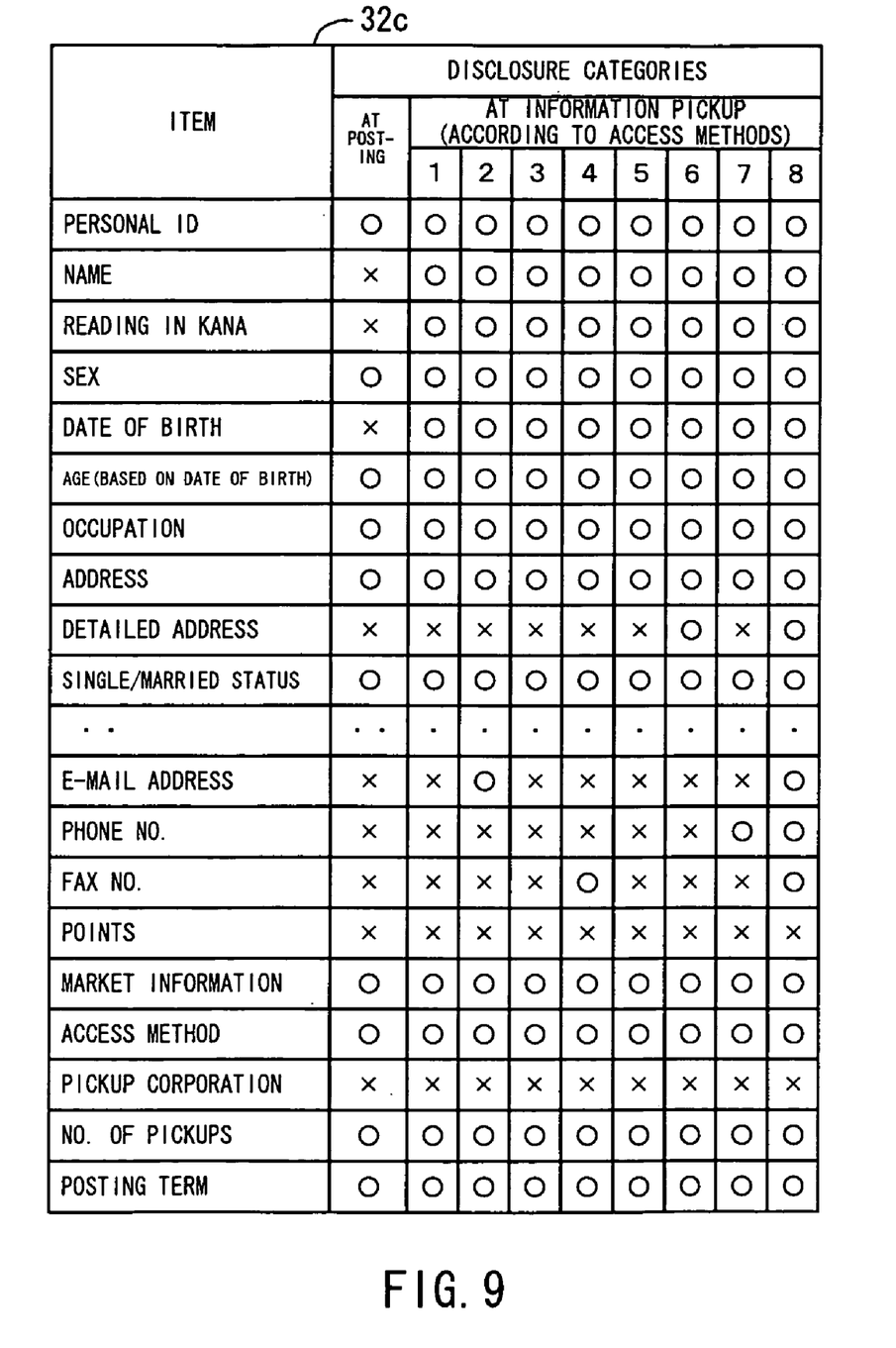
FIG. 9 is a diagram showing, by way of example, contents of a disclosure categorization file in which are set categories of information to be disclosed to corporate members.

FIG. 9 is a diagram showing, by way of example, the contents of a disclosure categorization file in which are set categories of information to be disclosed to corporate members. This disclosure categorization file 32c is registered, for example, in the market information registering section 31, and is referred to when the information extracting section 33 extracts the market information etc. The disclosure categorization file can be registered for each of the posting genres, and the illustrated example shows the disclosure categorization file 32c set for the real-estate genre.

The disclosure categorization file 32c specifies those items of information among the personal information and the market information which are to be presented to corporate members when the information is posted on the bulletin board 34 and when the information is picked up. In FIG. 9, sign "◯" indicates the items of information presented to corporate members at the time of posting and at the time of pickup. Namely, in the case of posting in the real-estate genre, "personal ID," "sex," "age (computed from the date of birth)," "occupation," "rough address," "single/married status," "market information," "access method," "number of pickups" and "posting term" are disclosed.

The items to be disclosed at the time of pickup of information differs depending on the access method. The access method is classified into those shown in FIG. 7; "1" indicates the items to be disclosed when the access method is indirect electronic mail, "2" indicates the items to be disclosed when the access method is direct electronic mail, "3" indicates the items to be disclosed when the access method is indirect facsimile transmission, "4" indicates the items to be disclosed when the access method is direct facsimile transmission, "5" indicates the items to be disclosed when the access method is indirect mail, "6" indicates the items to be disclosed when the access method is direct mail, "7" indicates the items to be disclosed when the access method is direct telephone call, "8" indicates the items to be disclosed when the access method is visit. For example, in the case where the access method is "1" which means indirect electronic mail, material about goods is sent by electronic mail directly from the service center 30, and therefore, although the consumer member's name and his/her rough address are disclosed to corporate members, the detailed address and information necessary to access the consumer member are not disclosed. On the other hand, in the case of the access method "8" permitting a visit, not only the detailed address, which is necessary to pay a visit directly, but also the electronic mail address, the telephone number and the facsimile number are disclosed as well.

Figure 10:
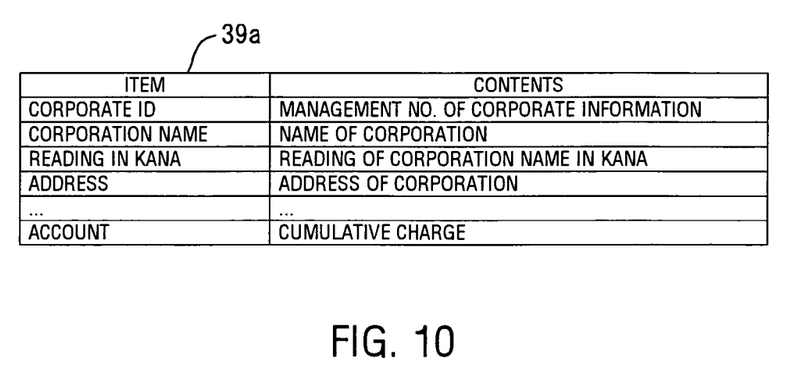
FIG. 10 is a diagram showing, by way of example, contents of a corporate information file.

FIG. 10 is a diagram showing, by way of example, the contents of a corporate information file. This corporate information file 39a is registered in the corporate information registering section 39 in association with each of the corporate members. The corporate information file 39a includes the item "corporate ID" which is a management number assigned to the corporate information, the item "corporation name," the item "reading of the name in kana characters," items of corporate information such as "address," and the item "account" in which is recorded the cumulative amount of money charged as a result of the accounting process by the accounting section 37.

Figure 11:
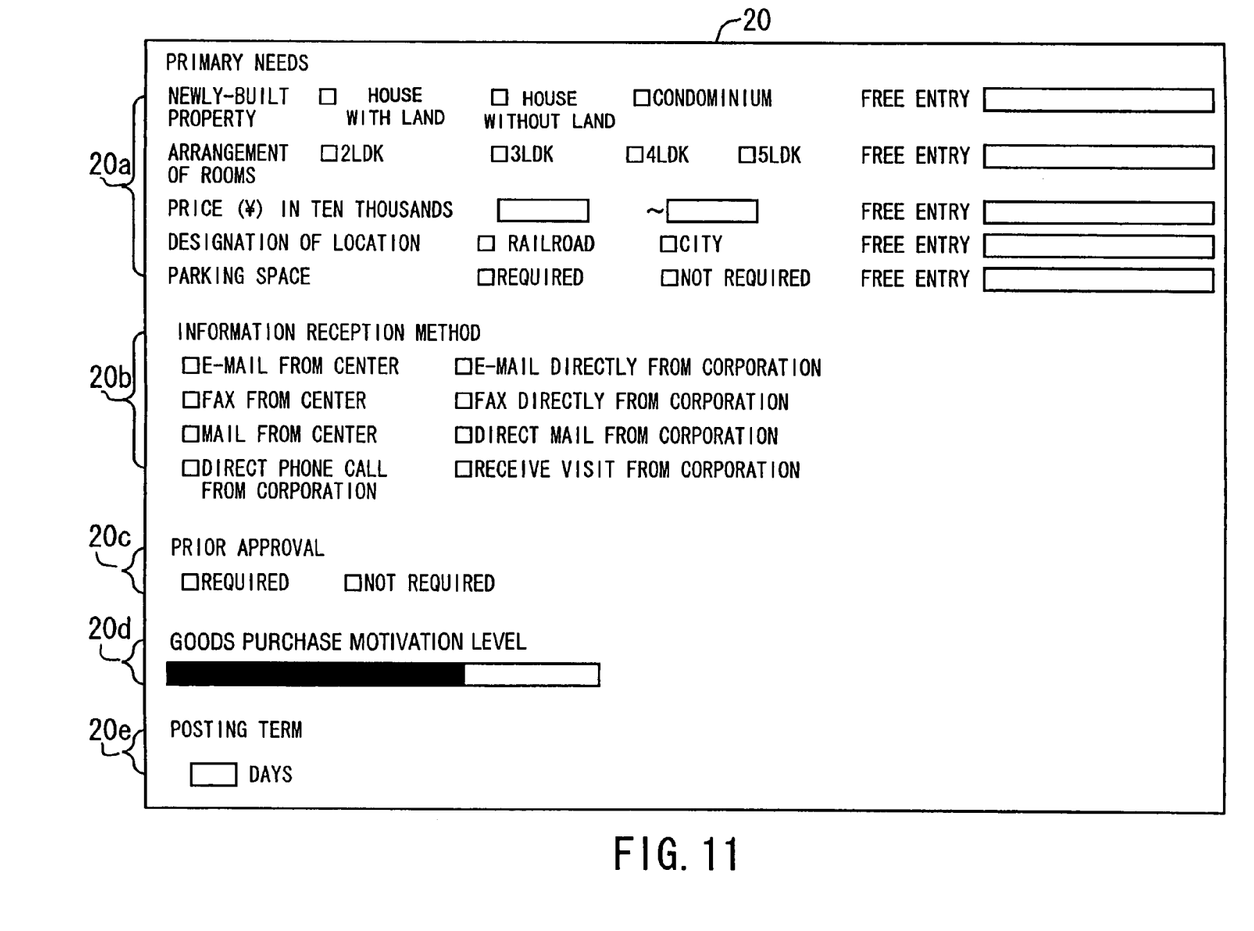
FIG. 11 is a diagram showing, by way of example, a market information registering screen for real-estate genre.

FIG. 11 is a diagram showing an example of a market information registering screen for the real-estate genre. When a consumer member registers market information in the real-estate genre in search of a newly-built property, a market information registering screen 20, for example, is displayed at the consumer member's terminal 21, 22, 23, . . . . This market information registering screen 20 is made up of a column 20a of primary needs, a column 20b of information reception method, a column 20c of prior approval, a column 20d of goods purchase motivation level, and a column 20e of posting term.

The primary needs column 20a includes a section for specifying newly-built house with land ownership, a house without land (building only), or condominium as a newly-built property, a section for specifying 2LDK (2 rooms with combined Living-Dining-Kitchen), 3LDK, 4LDK or 5LDK for interior structure, a section for specifying the price range, a section for specifying the location by means of railroad or city, and a section for specifying whether parking space is required or not. Besides these formatted choices, the primary needs column 20a includes free entry columns for the respective formatted choices so that needs that cannot be sufficiently described by selecting the formatted choices may be entered.

The information reception method column 20b includes a formatted section wherein the information reception method is selected from among the choices "indirect electronic mail via center," "electronic mail directly from corporation," "indirect FAX via center," "FAX directly from corporation," "indirect mail via center," "direct mail from corporation," "direct telephone call from corporation" and "receive visit from corporation"; where, indirect messages via center are selected when the recipient does not want to disclose his/her identity nor any direct access means to the originating sender of the message.

The prior approval column 20c includes a section for specifying whether prior approval is required or not. The goods purchase motivation level column 20d provides an analog representation of the degree of motivation to purchase goods in graphic form, for example. In the illustrated graphic representation, the motivation to purchase goods is less if the black bar is shorter, and is greater if the bar is longer. Instead of the graphic representation, the motivation to purchase goods may be expressed by selecting one of four categorized answers, namely, "almost sure to purchase," "considering purchase," "use material for reference" and "just collecting goods information." The posting term column 20e is a column in which is specified the period of time for which the information is posted on the real-estate genre bulletin board for newly-built properties.

The items of market information thus registered on the market information registering screen 20 are stored in the corresponding columns of the market information file 32a shown in FIG. 7. In the case where the motivation level to purchase goods is represented in graphic form, the level is translated into a percentage value to be stored.

Figure 12:
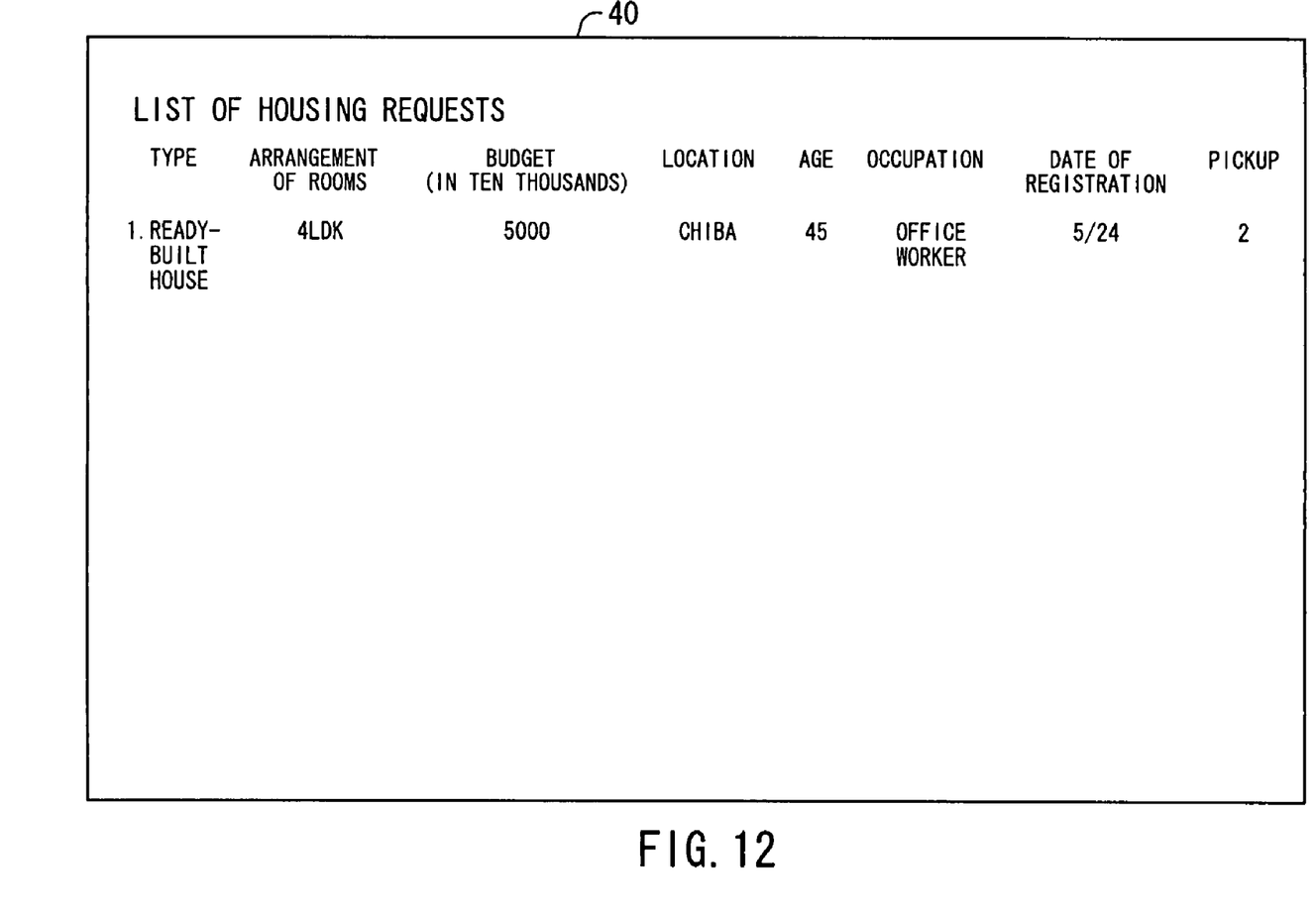
FIG. 12 is a diagram showing, by way of example, a market information browsing screen for the real-estate genre.

FIG. 12 is a diagram showing an example of a market information browsing screen for the real-estate genre. When a corporate member browses the market information for newly-built properties in the real-estate genre, a market information browsing screen 40, for example, is displayed at the corporate member's terminal 41, 42, 43, . . . . This market information browsing screen 40 shows a list of housing requests which lists a minimum of items that are necessary for corporate members to make comparisons for consideration, and such items include "type," "interior structure," "budget," "location," "age," "occupation," "date of registration" and "pickup." The item "pickup" indicates the number of corporate members which have already purchased the market information. When certain market information is selected from the list, a small window, for example, appears on the screen to display information such as free entry data except for the items used for making approaches to the consumer member.

When a prospective customer is selected from the list displayed on the market information browsing screen 40 and then picked up, the personal information including the items necessary to make approaches to the consumer member can be acquired.

Thus, the market information browsing screen 40 shows only the minimum items that allow corporate members to make comparisons for consideration, whereby primary demands for information of both corporate members and consumer members are satisfied and at the same time the consumer members' privacy can be protected to a certain degree.

Finally, the types and flows of actions performed in the purchase information servicing system will be summarized.

Figure 13:
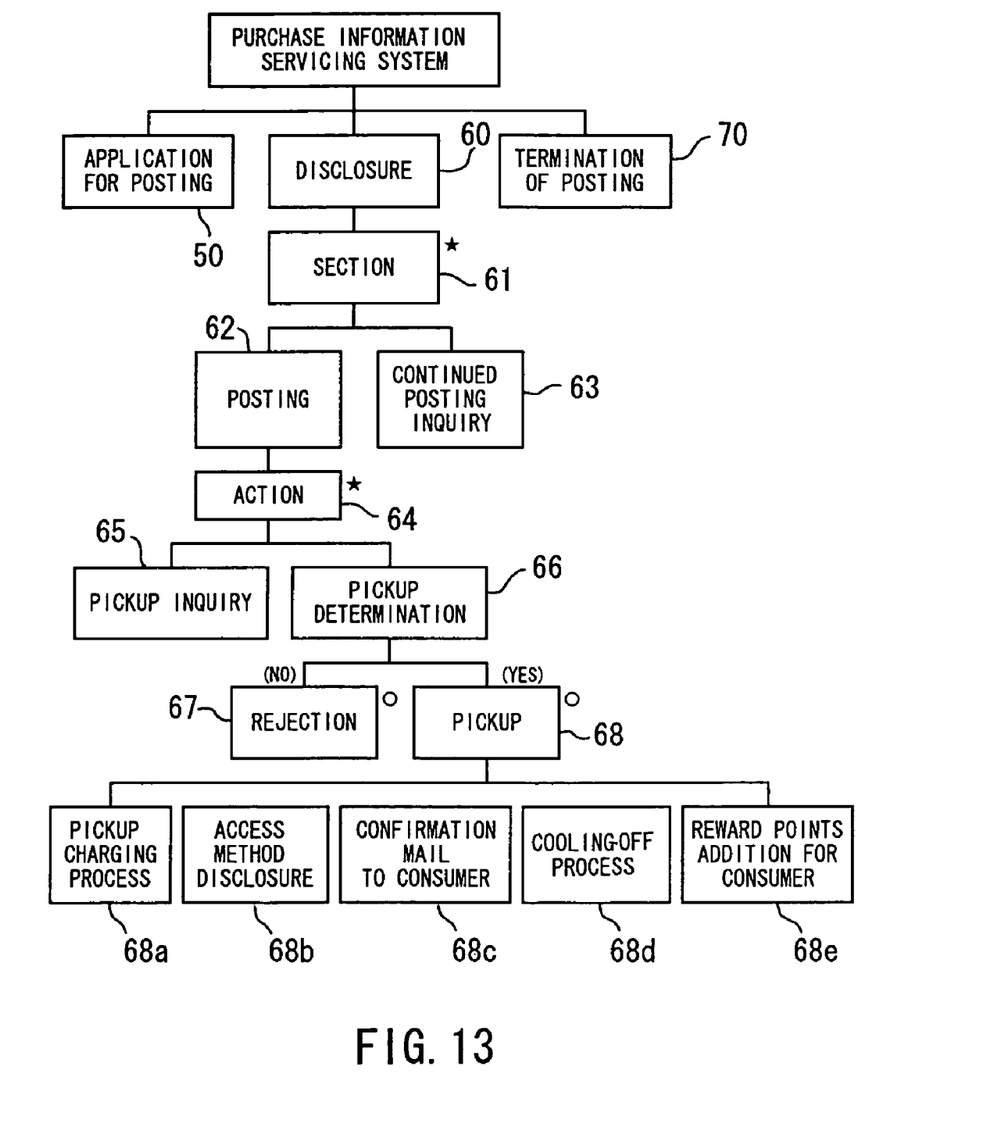
FIG. 13 is a structured diagram showing the purchase information servicing system.

FIG. 13 is a structured diagram illustrating the purchase information servicing system. This structured diagram shows how the elements constituting the purchase information servicing system relate to one another, wherein the flow of action is from top to bottom and is from left to right for the same level. As is observed in drawing structured diagrams, a box with a star indicates that the corresponding action takes place repeatedly, and boxes with a hollow circle indicate that either "YES" or "NO" action is executed at a certain moment.

Viewing the structured diagram in order from the top reveals that, macroscopically, the purchase information servicing system involves a series of stages including application-for-posting 50 as the first stage, then disclosure 60 in which the contents of information to be posted is disclosed after the application is accepted, and termination-of-posting 70 as the last stage.

In the application-for-posting stage 50, a genre is selected first. A consumer member who desires to purchase a house selects the real-estate genre while a consumer member who desires to purchase an automobile selects the automobile genre, and then the consumer member enters market information necessary for the application on the registering screen. Subsequently, a requirement examination is made to determine whether or not all that is necessary for the application for posting has been entered. Passing the requirement examination completes the receiving process.

Then, in the following disclosure stage 60, an operator at this location discloses part of the registered market information. The disclosure 60 connects with a section 61, and the posting term is counted by repetition of a unit time, for example, seven days. When a consumer member desires one-year disclosure, the one-year term is in practice counted by repeating a short section of seven days, for example. The section 61 is followed by a posting 62, where the market information is posted, and upon completion of the posting for one section, a continued posting inquiry 63 is made, so that the consumer member is inquired whether he/she intends to continue the posting of the market information. Specifically, the message processing section 36 of the system sends an inquiry to the consumer member by electronic mail, and if a reply is received from the consumer member to the effect that the posting should continue, then the market information is continuously posted thereafter.

While the market information is posted, an action 64 repeatedly takes place. First, as this action, a corporate member makes a pickup inquiry 65, and then a pickup determination 66 is made as to whether the consumer member concerned accepts or rejects the pickup. Such pickup determination is made repeatedly.

In the case of a rejection 67 in which the pickup is rejected as a result of the pickup determination 66, nothing takes place, which means that no pickup occurs. Accordingly, the corporate member is not charged.

If the consumer member determines to accept the pickup, a pickup 68 then takes place, and this pickup 68 develops into multiple processes as indicated below it. First, a pickup charging process 68a starts to charge the corporate member which has picked up the market information. Then, an access method disclosure 68b discloses the method of accessing the consumer member to the corporate member in accordance with the consumer member's designation. As the market information has been picked up, a confirmation mail 68c sends electronic mail to the consumer member for confirmation. Considering the situation where the consumer member's intention to purchase changes thereafter or the consumer member desires to reject approaches from the corporate member though he/she once approved the approaches, the consumer member is given a chance of a cooling-off process 68d so that he/she can cancel the purchase. In the case where the corporate member is refused because of the cooling-off process 68d, the pickup charge is paid back. If the cooling-off process is not executed within a predetermined time period, a reward points addition 68e adds reward points for the consumer member.

As described above, the present invention comprises the personal information registering means, the market information registering means, the posting means, and the personal information acquiring means, wherein consumers' needs are posted at the posting means, and a dealer, browsing the posted needs, purchases information about prospective customers to sell goods etc. Therefore, although in the conventional form of marketing, consumers themselves must look for a shop to obtain their desired goods or services, the consumers have only to disclose their demands so that dealers may make approaches to the consumers, whereby the time and labor required to look for shops can be saved. Also, since dealers can acquire in advance information about consumers with common interest in goods, the sales can advantageously be promoted.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A marketing system for processing market information of consumers and dealers via an electronic network, comprising:
    a personal information registering unit registering personal information of a consumer, where the personal information includes information personally identifying the consumer;
    a market information registering unit registering non-binding market information that advertises a non-binding market interest of the consumer;
    a posting unit for extracting and posting the non-binding market information registered in said market information registering unit while withholding from the dealers a portion of the personal information of the consumer necessary for a dealer to identify and contact the consumer about the viewed market information;
    a personal information acquiring unit purchasing and acquiring for a dealer, after the dealer has viewed the posted market information, the previously withheld portion of the personal information of the consumer necessary for the dealer to identify and contact the consumer about the viewed market information;
    a prior approval demand determining unit determining, based on the personal information registered in said personal information registering unit, whether prior approval by the consumer is required before the dealer can use the portion of the consumer's personal information to personally contact the consumer about the viewed market information;
    an access confirming unit seeking approval for access by the dealer from the consumer who registered the purchased market information, when said prior approval demand determining unit judges that the prior approval is required;
    an information extracting unit extracting, from the registered personal information, personal information to be disclosed to the dealer when access approval is confirmed; and
    a pickup processing unit permitting the dealer to pickup the personal information extracted by the information extracting unit; and
    an accounting unit for charging the dealer when the dealer has purchased the market information posted at said posting unit,
    wherein said access confirming unit cancels the purchase of the personal information by the dealer when the consumer does not approve the dealer's access.

2. The marketing system according to claim 1, wherein the personal information registered in said personal information registering unit includes a type of access to the consumer.

3. The marketing system according to claim 2, wherein the type of access includes at least one of indirect or direct electronic mail, indirect or direct facsimile transmission, indirect or direct mail of material, telephone call, and visit.

4. The marketing system according to claim 1, wherein the personal information registered in said personal information registering unit includes pre-categorized information and format-free information.

5. The marketing system according to claim 1, further comprising a posting continuation confirming unit for performing at regular intervals of time a process of inquiring of the consumer whether the consumer desires the market information to be continuously posted at said posting unit.

6. The marketing system according to claim 1, further comprising a point providing unit for giving the consumer a bonus point when the consumer has registered the personal information or market information.

7. The marketing system according to claim 6, wherein said point providing unit gives the consumer an extra point if the consumer purchases goods from the dealer who has purchased the market information.

* * * * *